United States Patent
Goddard / Imel (10) Patent No.: US 9,961,875 B2
(45) Date of Patent: May 8, 2018

(54) "KITTY CAT CAN" EXTERIOR MOUNTED LITTER BOX FOR IN-DOOR CATS AND KITTENS AND OTHER SMALL ANIMALS

(71) Applicant: Sharon Louise Goddard / Imel, Torrance, CA (US)

(72) Inventor: Sharon Louise Goddard / Imel, Torrance, CA (US)

( * ) Notice: Subject to any disclaimer, the term of this patent is extended or adjusted under 35 U.S.C. 154(b) by 112 days.

(21) Appl. No.: 14/794,224

(22) Filed: Jul. 8, 2015

(65) Prior Publication Data
US 2017/0006821 A1 Jan. 12, 2017

(51) Int. Cl.
*A01K 1/01* (2006.01)

(52) U.S. Cl.
CPC .................... *A01K 1/0107* (2013.01)

(58) Field of Classification Search
CPC .. A01K 1/0107; A01K 1/0125; A01K 1/0245; A01K 1/033; A01K 1/035
USPC ......................................... 119/484
See application file for complete search history.

(56) References Cited

U.S. PATENT DOCUMENTS

| | | | |
|---|---|---|---|
| 2,932,279 A | 4/1960 | Giles | |
| 4,021,975 A * | 5/1977 | Calkins | A01K 1/033 119/165 |
| 5,081,956 A * | 1/1992 | Greitzer | A01K 1/033 119/500 |
| 5,165,366 A | 11/1992 | Harvey | |
| 5,195,457 A * | 3/1993 | Namanny | A01K 1/0353 119/165 |
| 5,261,350 A * | 11/1993 | Vavrek | A01K 1/0353 119/165 |
| 5,651,331 A * | 7/1997 | Cleri, Jr. | E06B 7/32 119/484 |
| 5,842,438 A | 12/1998 | Messmer | |
| 5,975,017 A | 11/1999 | Cameron | |
| 6,234,116 B1 * | 5/2001 | Havener | A01K 1/033 119/452 |

(Continued)

OTHER PUBLICATIONS

"On the Wind: Bungee hatch holder," available at http://closefetch.blogspot.com/2011/10/bungee-hatch-holder.html, published Oct. 30, 2011.*

(Continued)

*Primary Examiner* — Lisa L Tsang
(74) *Attorney, Agent, or Firm* — Robert J. Lauson, Esq.; Lauson & Tarver LLP (57) ABSTRACT

Improvements in an exteriorly mounted cat litter station, called "Kitty Cat Can", mounts on the exterior of a building to create a bump-out toilet for cats, which live indoors. It is installed against an opening through a wall so cats can go back and forth without leaving the house. A hinged roof slops with long eave extensions and covers the screened slots at the top of the outer container for water tightness. This seamless unit mounts, held by its own weight, onto an integrated horizontal ledger hook which has been installed on the exterior of a dwelling. Optional openings in the back provide flexibility upon installation. A secondary high-walled reusable container fits snuggly inside and is held in place by the removable passage sleeve. Liner and sleeve stay in place for routine litter raking, although if more aggressive cleaning is desired, the sleeve and liner lift out completely.

20 Claims, 8 Drawing Sheets

(56) References Cited

U.S. PATENT DOCUMENTS

| | | | | |
|---|---|---|---|---|
| 6,237,534 | B1* | 5/2001 | Schwartz | A01K 1/0107 119/165 |
| 6,439,161 | B1 | 8/2002 | Clemmons | |
| 6,945,193 | B1* | 9/2005 | Tanner | A01K 1/0107 119/165 |
| 7,152,553 | B2* | 12/2006 | Poirier | A01K 39/014 119/429 |
| 7,322,315 | B2* | 1/2008 | Brewer | A01K 1/033 119/474 |
| 7,530,331 | B1 | 5/2009 | Malachowski | |
| 7,614,363 | B2 | 11/2009 | Di Angelo | |
| 8,074,606 | B1* | 12/2011 | Schrey | E06B 7/32 119/484 |
| 8,881,680 | B1* | 11/2014 | Woody | A01K 1/0114 119/165 |
| 2003/0168017 | A1 | 9/2003 | Perelli et al. | |
| 2005/0284399 | A1 | 12/2005 | Asma | |
| 2006/0124073 | A1* | 6/2006 | Croft | A01K 1/033 119/482 |
| 2009/0008005 | A1* | 1/2009 | Chu | A01K 1/03 150/154 |
| 2009/0064939 | A1* | 3/2009 | Cirincione | A01K 1/0107 119/161 |
| 2009/0255481 | A1* | 10/2009 | Bosserdet, Jr. | E06B 7/32 119/484 |
| 2013/0160381 | A1 | 6/2013 | Sommer | |
| 2013/0263790 | A1* | 10/2013 | Stange | A01K 1/0107 119/165 |

OTHER PUBLICATIONS

Meowthouse.com.
Outdoorlitterbox.com.
PCT Application No. PCT/US2016/039525 Written Opinion of the International Searching Authority.
PCT Application No. PCT/US2016/039525 International Search Report.

\* cited by examiner

"KITTY CAT CAN" EXTERIOR MOUNTED LITTER BOX FOR IN-DOOR CATS AND KITTENS AND OTHER SMALL ANIMALS

CROSS REFERENCE TO RELATED APPLICATION

This application claims the benefit of Provisional Application Ser. No. 62/178,631 filed Apr. 14, 2015 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in a cat litter box. More particularly, the present "Kitty Cat Can" Exterior Mounted Litter Box for In-Door Cats & Kittens & Other Small Animals allows an in-door pet to essentially exit through a wall and utilize a litter box that is mounted to the outside of the house.

Description of Related Art Including Information Disclosed Under 37 CFR 1.97 and 1.98

Many pet owners have in-door pets that don't travel outside of the house where the animal can permanently leave or become harmed by other animals that live around the house. There are other pet owners that do not want a house to smell like animals. The smell is often generated by a litter box which also takes up valuable space in a home. Moving the litter box outside of a house often requires the animal to exit the safety and security of the house. An option to satisfy these issues is to secure an enclosed litter box to the outside of a house and then cut a hole from the inside of a house into the enclosed exterior litter box. A number of patents and or publications have been made to address these issues. Exemplary examples of patents and or publication that try to address this/these problem(s) are identified and discussed below.

U.S. Pat. No. 5,975,017 issued on Nov. 2, 1999 to Eddie M. Cameron discloses an Exterior Mounted Housing for Animal Litter Box. This patent has a housing that is mounted on the exterior side of a dwelling having a storage compartment for removably holding a litter box. A hollow open-ended tunnel interconnects the interiors of the dwelling and housing respectively. While this patent discloses an exterior mounted litter box, access to the litter box is available from the side of the litter box and further includes an upper sleeping area that is not accessible for cleaning.

U.S. Pat. No. 6,439,161 issued on Aug. 27, 2002 for Ronald E. Clemmons discloses an Exterior Litter box. This patent has a litter box enclosure mounted on or against an exterior wall of a structure includes a gated passage permitting a pet free access to and from a litter container. The litter box in this patent is on a pivoting base whereby rotating the litter box empties the litter into a collection bag located under the enclosure and also creates plastic landfill waste. This patent has minimal access for cleaning the interior of the enclosure.

U.S. Patent publication 2003/0168017 was published on Sep. 11, 2003 for Jack Aldon Perelli et al., discloses a Cat Outhouse and Method for Using Same. The cat outhouse attaches to the exterior of a house and comprises a box-like shelter, a litter pan, and at least one pass-through door so that the cat can enter the litter box from the inside of the house. While this cat outhouse allows for an exterior litter box, access to the litter box is with a side door, and further sits on the ground where water can flow into the outhouse.

What is needed is an outhouse for an indoor pet. The Ideal outhouse would be mountable to hang onto an exterior wall of a building were animals would be able to go in and out from where they live indoors. Animals would have the convenience of an outhouse to have the choice for privacy and a choice to keep their living space preferably clean and fresh. The outhouse should be seamless in appearance with a hinging roof that locks and slopes to shed water over protected ventilation. It should be roomy inside with high walls to discourage liquid from being trapped in unwanted places. It should have a high walled removable litter liner that may be used over and over to ease landfill waste. The outhouse in this document provides a solution.

BRIEF SUMMARY OF THE INVENTION

It is an object of the exteriorly mounted cat litter containment housing for the "Kitty Cat Can" to be an exteriorly mounted cat litter containment housing, or outhouse, for use by indoor cats, kittens, and other small indoor house pets, that live indoors. Animals enter the exteriorly mounted cat litter containment housing from the inside of the home through an opening leading to the outside, but inside to the security of the "Kitty Cat Can" to use the toilet.

It is an object of the exteriorly mounted cat litter containment housing to have an angled roof with long eves. The angled roof with long eves allows rain to flow off the roof and away from the housing. This prevents rain from getting in or collecting on top of the enclosure, also it is less likely for debris to collect making easy maintenance.

It is an object of the exteriorly mounted cat litter containment housing to have a hinged top lid. The hinged lid allows the enclosure to be fully opened to allow access to the interior of the enclosure while the lid stays connected. Having a lid that stays connected while open allows for ease of cleaning the containment enclosure and easy lid re-closing. The hinged lid provides access for servicing a litter box within the enclosure.

It is another object of the exteriorly mounted cat litter containment housing to have a high walled removable interior liner container. The removable interior liner can be completely removed from the main outer container to invert as desired, and clean and dry for use indefinitely to help ease landfill waste.

It is another object of the exteriorly mounted cat litter containment housing to be removable from the exterior of a building. The enclosure is held onto the exterior of a building with an angled or tapered rail that retains the enclosure onto the house. By lifting the enclosure it can be easily removed from an exterior of a building for cleaning and re-hung into its position in an instant.

It is still another object of the exteriorly mounted cat litter containment housing to offer one or a plurality of access openings. The plurality of access openings in the back allows the entrance opening to be at either side of the enclosure. This allows the enclosure to be placed as a left justified or a right justified orientation on a building.

Various objects, features, aspects, and advantages of the present invention will become more apparent from the following detailed description of preferred embodiments of the invention, along with the accompanying drawings in which like numerals represent like components.

DETAILED DESCRIPTION OF THE INVENTION

Figure 1:
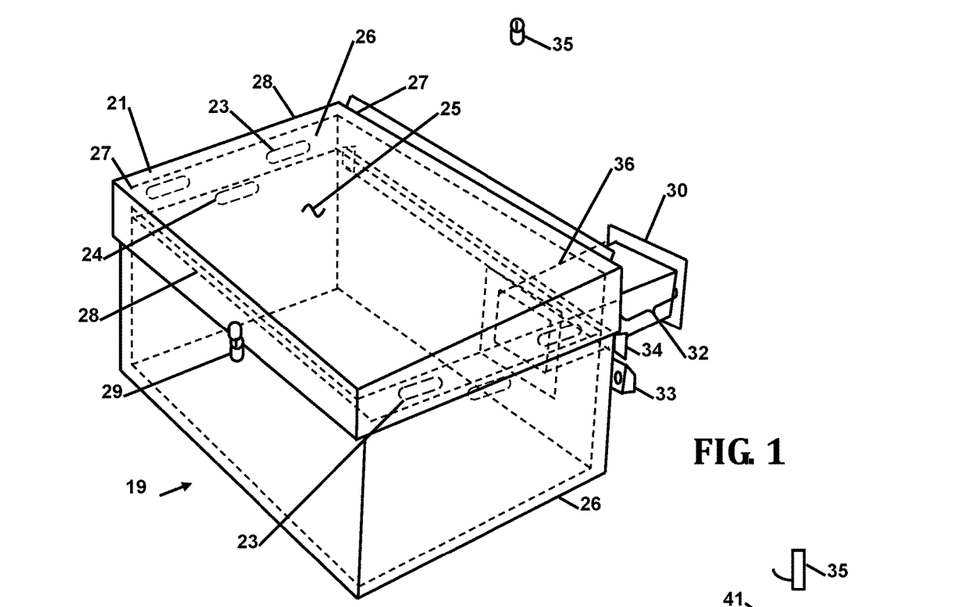
FIG. 1 shows a view from an angle above peering down through the lid into the container.
Figure 2:
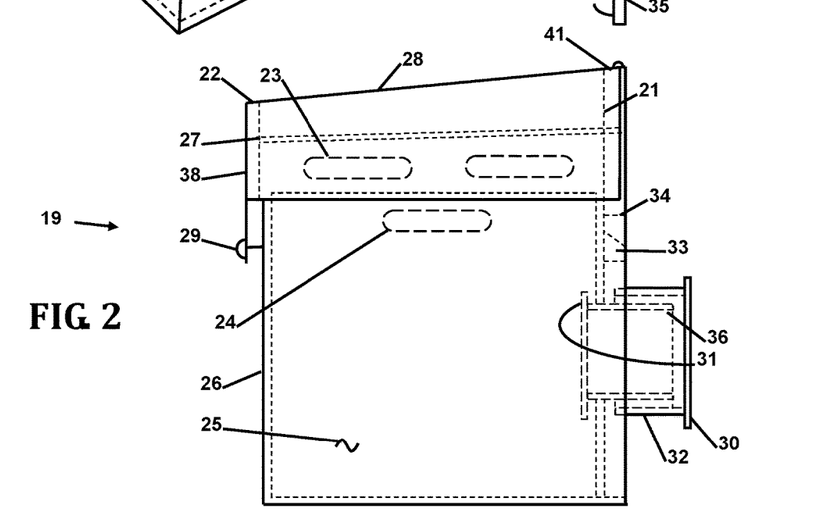
FIG. 2 shows a section view through the porthole area.

FIG. 1 shows a view from an angle above peering down through the lid into the container and FIG. 2 shows a side section view through the porthole area. The exteriorly mounted cat litter containment housing consists of a series of parts which creates a high-walled container inside of a housing containment, for exterior use, which has a hinged lid with a locking latch 29, and an entry hole, which suspends itself by a mounting on an exterior wall of a building, creating a complete working unit. It may have sharp angle corners or rounded and may be stackable.

There is a main mounted outer containment box 26, which gets securely mounted and hung on a ledger receiving hook 33 on the outside of a building and it houses a high-walled inner container 25 open at the top to the inside of the outer box 26. The height of the walls is between 18 and 36 inches in height to allow enough space for the animal to comfortably turn around. The main mounted outer containment box 26 has a complimentary ledger receiving mount 34 that secures the receiving ledger or hook 33 to removably secure the containment box 26 onto a building. There is a sloped lid 28 with an inner rim 21 and a lid joint 27 which seats itself completely around the upper circumference of the main outer containment box 26 creating a seal under the lid, which prevents bugs and insects from entering the inside of the container 19. Below the lid joint 27 and inner lid wall at the top of the main outer box containment 26 are screened fresh air vent slots 23 located high up above the high walled liner 25, but below the lid joint 27, to allow air circulation which is designed to circulate air in and around inside the box and out to provide fresh air to the animals and to allow for odors to exit to the outdoors. The sloped lid 28 has an outer rim, or eve, a space away from the inner seating rim, which is long enough to pass over the air vent slots 23, but still keep away from the box wall allowing air to enter, but not rain. The long eve makes the containment rainproof.

A second box 25 is located just inside of the main outer containment box 26 and has high walls that come up just below the screened vent slots 23 leaving enough space between the outer box and the inner box so it can lift out easily without friction. The inner box container holds cat litter and has built in handle cut-outs 24 at the top on each side to use during litter changes. The inner box container has extra high walls which keeps the cat mess inside the container and less likely to be trapped in unwanted areas.

In order for cats or small house pets to enter and exit this containment from the inside of a home or dwelling to inside of this container that is mounted outside of the building, there is a portal cut out to create a short hall way between the indoors, and the container box outdoors. There is a two-piece portal liner placed through the hallway cut out through the wall of the building that has a perpendicular flange at each end creating casings for a clean finish to the portal. AR The indoor portal liner overlap 32 seals the indoor portal liner 32 and casing 30 to the inside of the building, while the exterior inner route portal liner overlap 36 and casing 31 seals the exterior portal route 36 on the interior of the containment. The sealed indoor portal line 32 and casing 30, overlap the inner route portal liner allowing for portal lining adjustment to the thickness of an exterior wall of the building, and may have a pin 51 to hold it in place if necessary.

Figure 3:
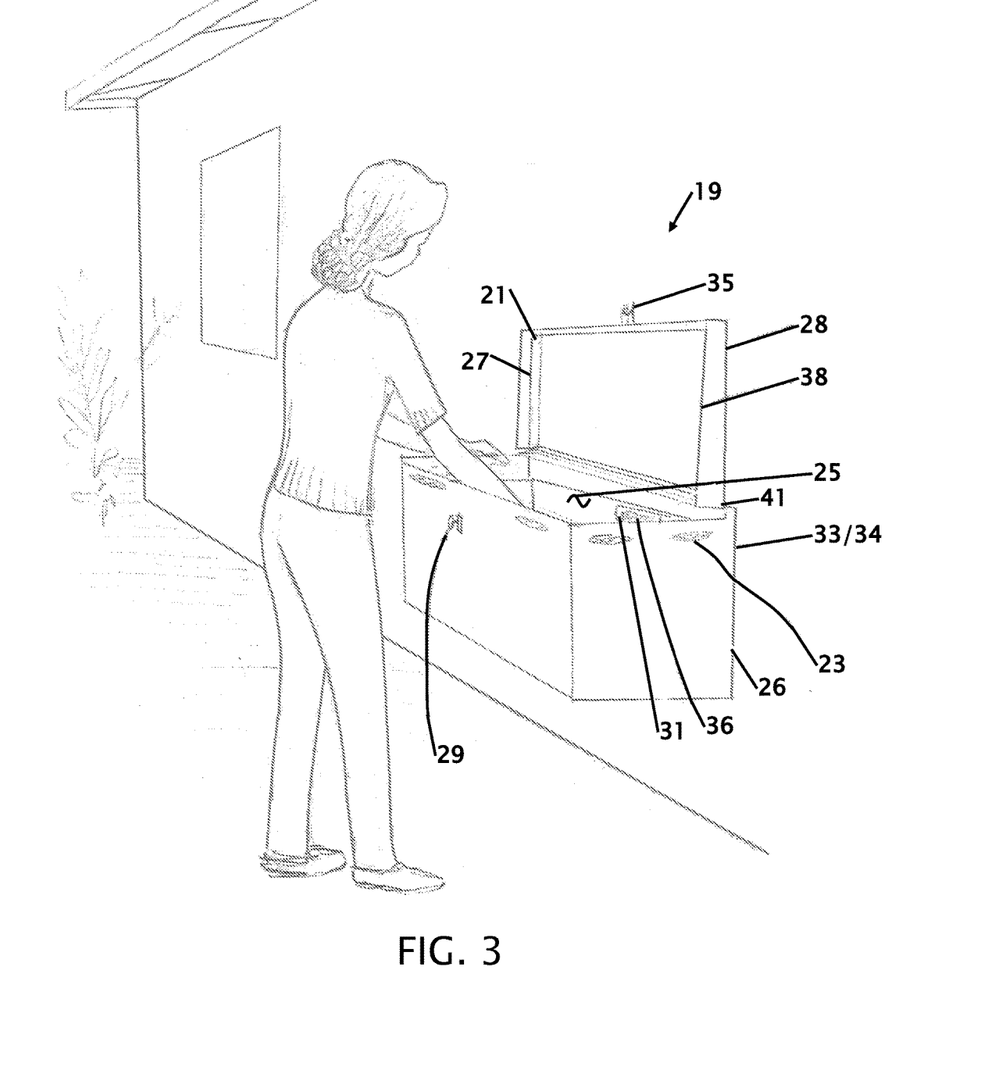
FIG. 3 shows a "Kitty Cat Can" mounted at about waist height and being used with the lid in the open position on the outside of a building that has a raised foundation.

FIG. 3 shows a "Kitty Cat Can" 19 mounted and being used on the outside of a building with a raised foundation at about waist height. The lid 28 is shown in the opened position latched onto the lid hook 35 with the container seal 27 showing under the lid in the up position. The fascial overhand 38 surrounds the walls of the outer enclosure when closed in the flanged down position and covers the screened slots. The porthole liner 31 and route overlap 36 creates a seal, going through the wall. Regular litter cleaning is done from the outside of the building standing next to the containment usually on a daily schedule. The high-walled litter container box 25 may be completely removed monthly for complete replenishment of litter. The complimentary ledge hook 33 and mount 34 are recessed and hidden in this view at the back of the unit. The screened slots 23 are shown on the side of the housing with the lid in the open position. The porthole passageway 36 is seen in the interior of the housing (s). The porthole flange 31 is in place for daily use on the exterior side of the container and holds the liner container in place. Once a month the flange 31 can be pulled out temporarily so the high-walled liner box 25 can lift out for thorough cleaning. After the cleaning is done, the box is lowered back into the main containment box and the porthole flange 31 is secured back into its place. Then clean litter is placed in the litter container box to start the use again. The "Kitty Cat Can" 19 is easy to install and service and allows the pet owner freedom to have a pet stay safely inside the house, but not have the mess and odors of a common litter box, or the unwanted furniture obstacles taking up valuable indoor space.

Figure 4:
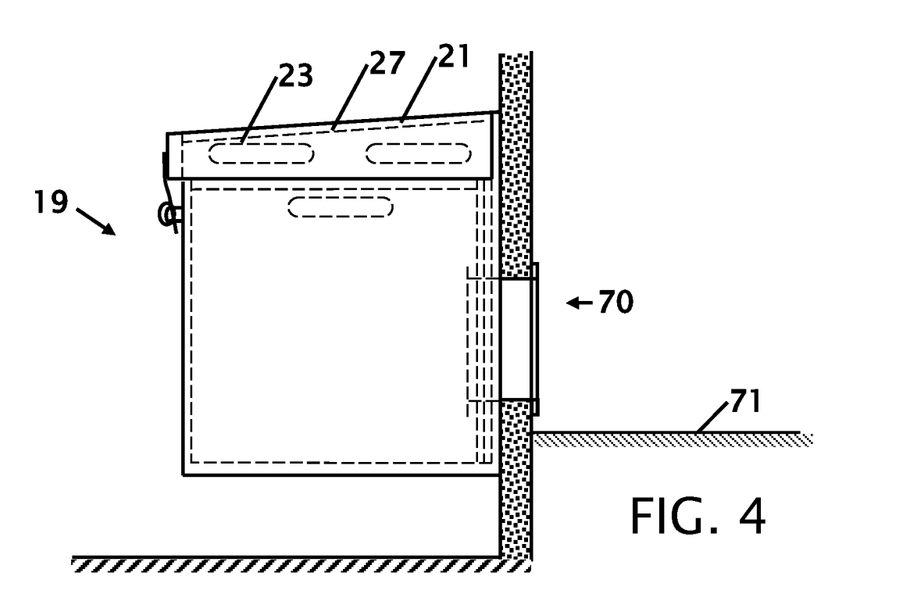
FIG. 4 shows a first preferred embodiment of the "Kitty Cat Can".
Figure 5:
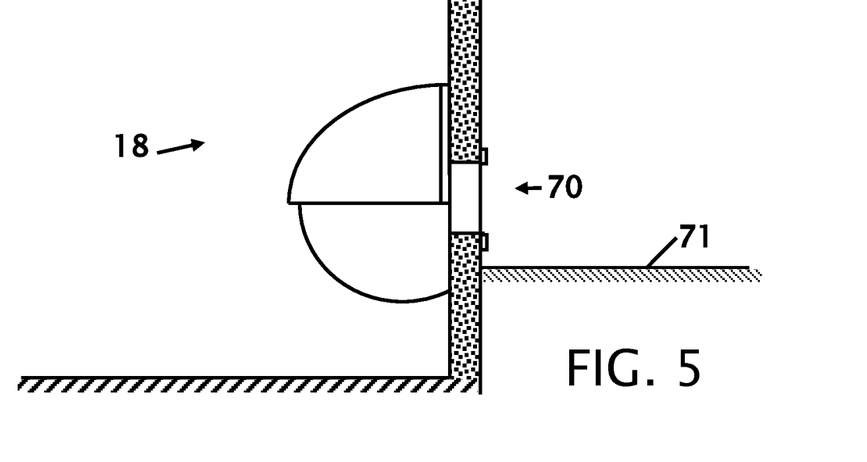
FIG. 5 shows a second preferred embodiment of the "Kitty Cat Can".

FIG. 4 shows a first preferred embodiment of the "Kitty Cat Can" 19 and FIG. 5 shows a second preferred embodiment of the "Kitty Cat Can" 18 and other contemplated shapes, but not limited to, and could also be textured material, seamed or jointed for shipping purposes, and various colors. These figures show the porthole access opening 70 and the floor approach 71 of the interior of the building.

Figure 6:
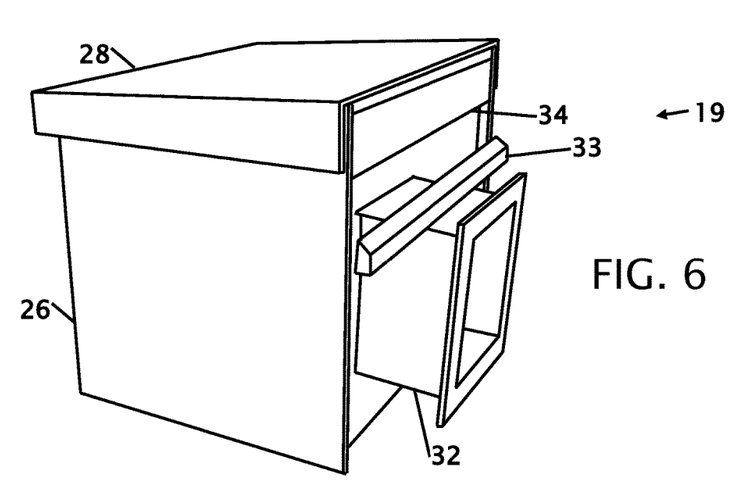
FIG. 6 shows an image of the "Kitty Cat Can" from the house perspective.
Figure 7:
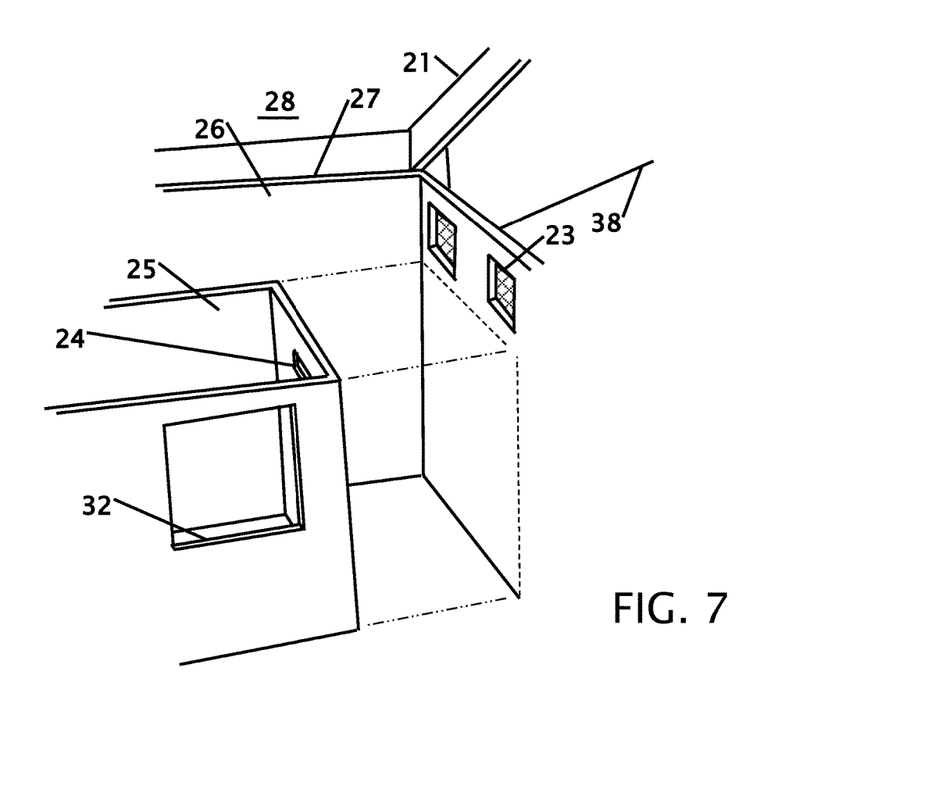
FIG. 7 shows an image of the "Kitty Cat Can" from an outside perspective viewing the "Kitty Cat Can" through an elevated lid.
Figure 8:
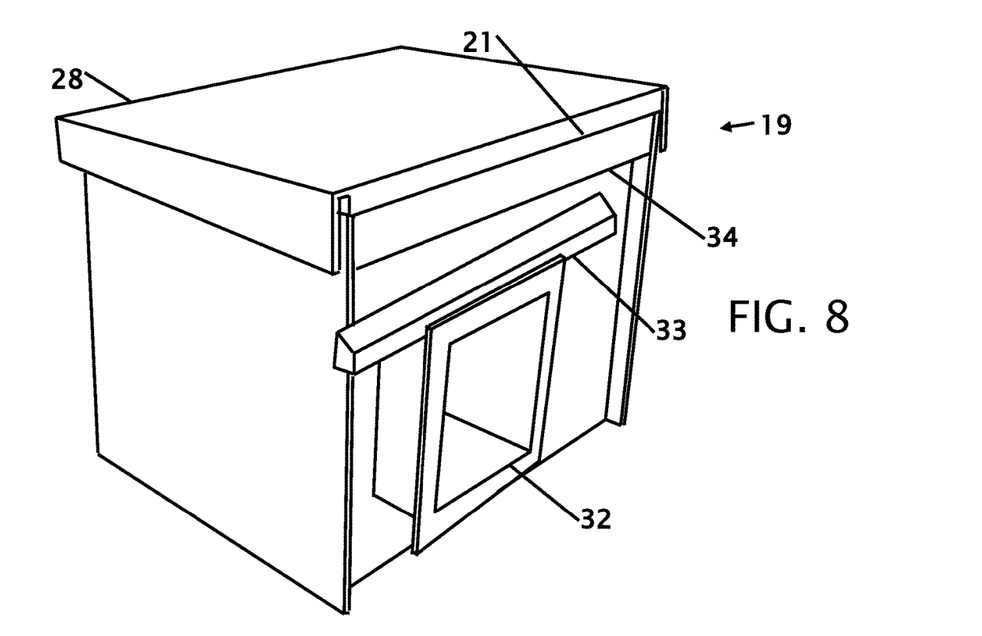
FIG. 8 shows another image of the "Kitty Cat Can" from the house perspective.
Figure 9:
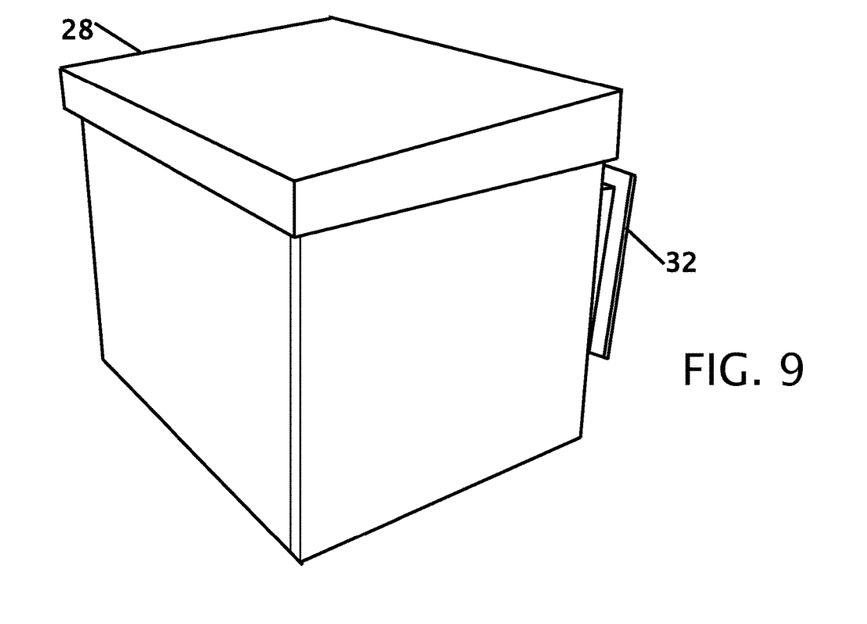
FIG. 9 shows another image of the "Kitty Cat Can" from an outside perspective view.
Figure 10:
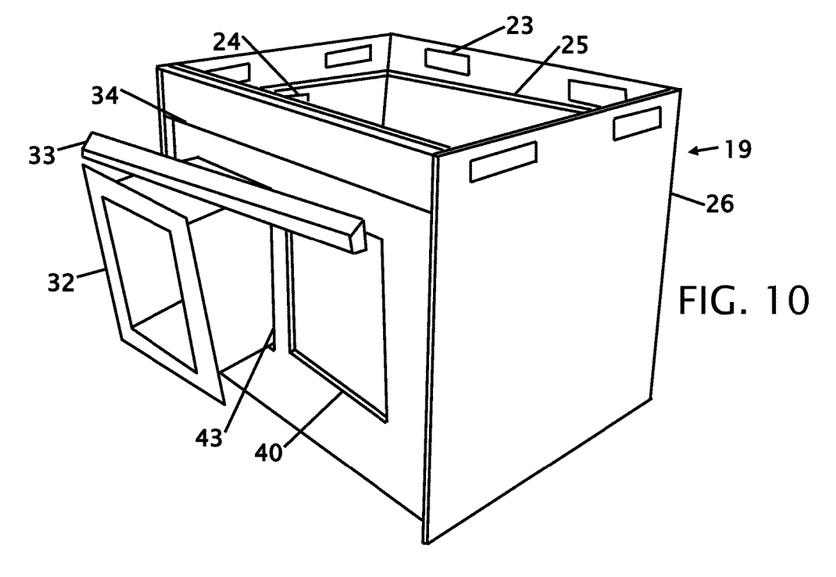
FIG. 10 shows still another image of the "Kitty Cat Can" from the house perspective without the lid.
Figure 11:
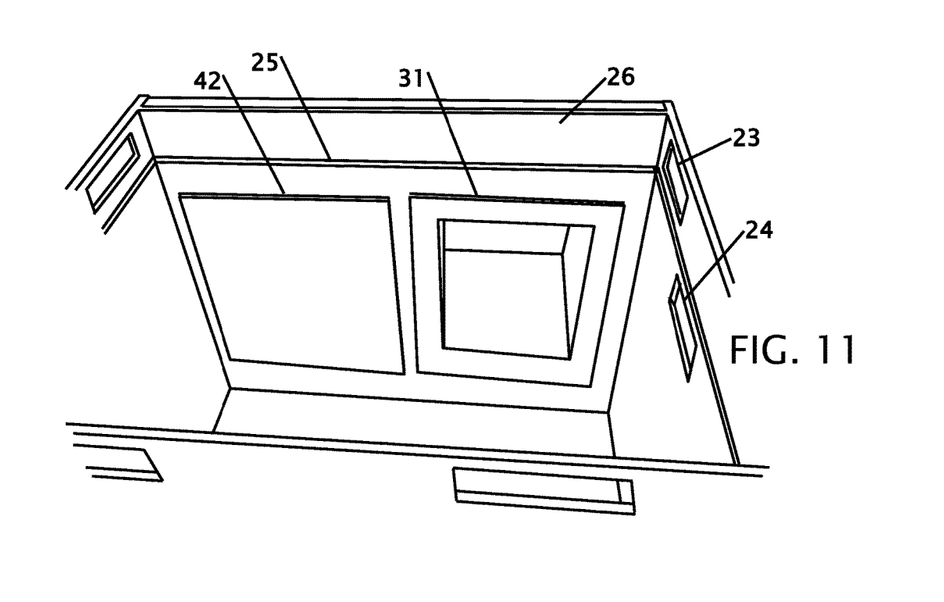
FIG. 11 shows an image of the "Kitty Cat Can" from an outside perspective viewing the "Kitty Cat Can" with the lid removed.

FIG. 6 shows an image of the "Kitty Cat Can" 19 from the house perspective, FIG. 7 shows an image of the "Kitty Cat Can" 19 from an outside perspective viewing the "Kitty Cat Can" through an elevated lid, FIG. 8 shows another image of the "Kitty Cat Can" from the house perspective, FIG. 9 shows another image of the "Kitty Cat Can" from an outside perspective view, FIG. 10 shows still another image of the "Kitty Cat Can" from the house perspective with an optional port hole 40 and FIG. 11 shows an image of the "Kitty Cat Can" from an outside perspective viewing the "Kitty Cat Can" with the lid removed and the optional porthole covered with the optional porthole cover plate 42.

Figure 12:
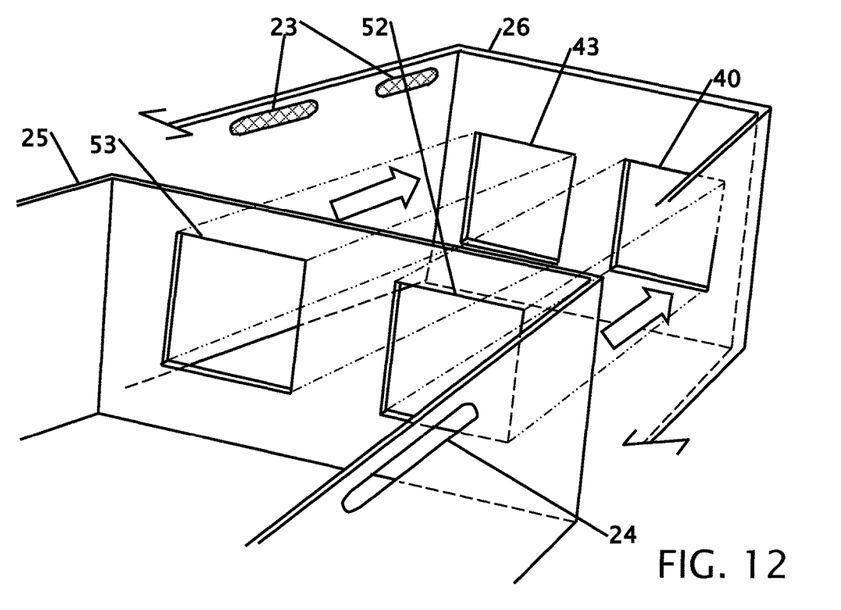
FIG. 12 shows an interior view of the "Kitty Cat Can" with the high walled inner container displaced from the outer container.
Figure 13:
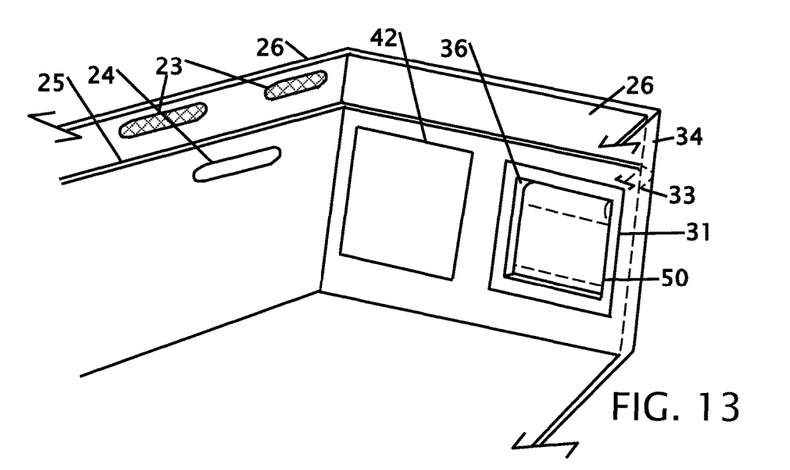
FIG. 13 shows in interior view of the "Kitty Cat Can" with the high walled inner container nested within the outer container snugged into place and held with the porthole flange unit.

FIG. 12 shows an interior view of the "Kitty Cat Can" with the inner container 25 displaced from, and lining up with the outer container 26, and FIG. 13 shows in interior view of the "Kitty Cat Can" with the inner container 25 nested within the outer container 26. In FIG. 13, curtain or weather door 50 is shown to reduce air flow from the "Kitty Cat Can" into the house.

Figure 14:
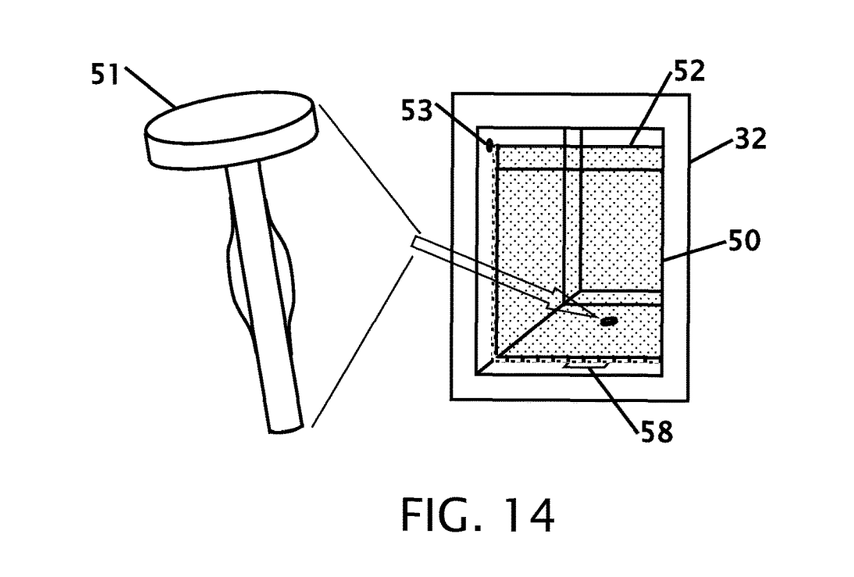
FIG. 14 shows a view of the porthole with a curtain.
Figure 15:
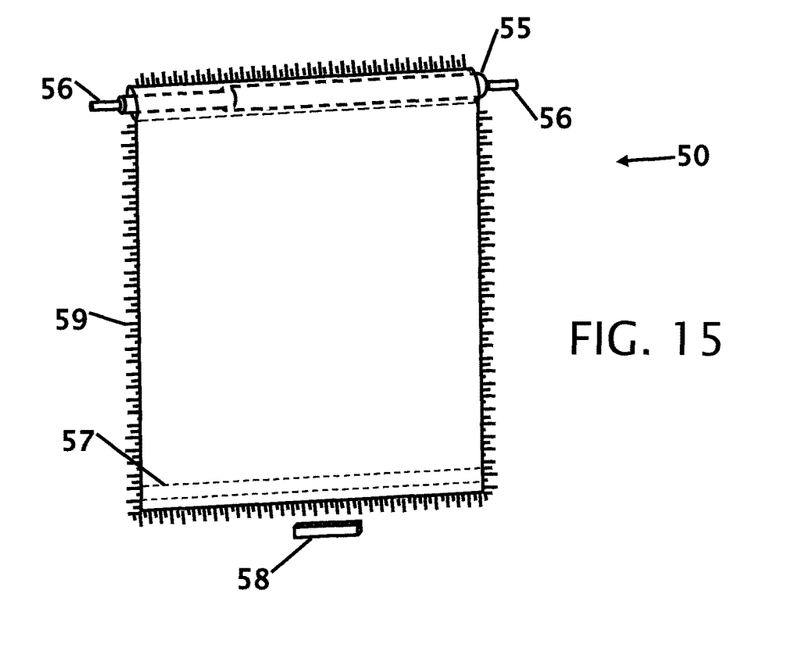
FIG. 15 shows a detailed view of the curtain.

FIG. 14 shows a view of the porthole with a curtain 50 and FIG. 15 shows a detailed view of the curtain. The curtain 50 is glued, bonded or hung 52 onto an expandable tension rod 55 having pins 56 that engage into holes 53 in the porthole 36. The curtain is preferably a heavy washable vinyl coated fabric for insulation and may have a weather strip edging 59 to improve sealing and insulation. Locking pin 51 fits through a hole in the porthole to maintain the position of the porthole 36 at the rear of the "Kitty Cat Can". A weight 57 may or may not be used to hold the curtain down. A magnet 58 can further be used to hold the curtain in position. The curtain 50 can be fabricated with a loose pocket to allow the curtain to be removed for washing or it may be of a hard plastic material made easy for washing as well.

Once the "Kitty Cat Can" is installed, a cat litter can be filled into the liner box. The litter is to be raked daily by lifting the lid to its catch position, and releasing the lid down to rest in the closed and latched position. Periodically the entire inner container can be removed by slipping out the porthole corridor 36 from the inside of the litter box and lifting out the removable litter box container 25 to dump the contents and do a more thorough the maintenance cleaning. It can be cleaned indefinitely and no plastic bags or disposable containers are needed, which saves our landfills from abuse. The enclosure is made of high quality material and can be ultimately recycled. The material can include, but not be limited to plastic, wood or metal.

The lid 28 hinges 41 are attached to the house or on the box itself, depending on the model or series. It rests directly lined on top of the main box upper rim creating a seal with or without weather stripping in place to keep it safe from outdoor pests.

There are weather curtains that mount over the opening on the inside of the house that are soft and welcoming to pets. They can be washed and install much like a rod pocket curtain on a rod with brackets. They can have magnets or weights as well depending on which series, and climate the order will be placed for. Spring loaded tension rod and magnetized weather curtain available for exterior porthole.

In the corridor of the porthole is 32/36, a tray can be attached that contains short textured material to help with litter tracking prevention or the tracking material may be secured with adhesive.

How to Make the Enclosure

The "Kitty Cat Can" containment unit has 6 parts and 2 optional accessories to be constructed; The outer containment box 26 or housing, with two portholes cut out options in the back and screened slots on three of the walls, ledger bar 33, Inner litter container box 25 flanked with two handles and with two cut outs 52 and 53 that line up with the main outer box cut outs 40 and 43, two Portal tubes with connecting overlaps or casings, interior 32 and exterior 36, sloped lid 28 with eave gaps on three sides between the inner lid wall and long fascia overhang 38, 1 cut out cover plate 42 to put over the un-used porthole cut out that won't be selected. Accessory options include, but are not limited to Porthole curtain containing a rod and brackets, weather flap, and weather strip 59 with a mini spring tension rod 55/56 and magnetized weight 58 is shown in FIGS. 14 and 15.

Note* In order to use this product, an opening must be created in a wall of a building as would be created for a dog or cat door, but much smaller in comparison. The opening must not interfere with any of the building structure or fixture components.

To begin, a certain size small cut, out must be made completely through a wall in an interior wall of a dwelling structure or house where it will not interfere with anything on the inside or outside of the building or anything inside of the wall. The first cut should be made only as deep as the drywall or plaster to examine if the wall location will be satisfactory and clear of any structural members or utility contents. Once the cut is determined to be clear the cut to the outside can proceed with an exploratory drill hole to make sure the area is clear on the exterior side of the opening. The area inside and out must be measured to make sure there is room for the unit. The area on the wall on the inside should be clear to allow about an inch more than the size of the #32 casing, FIG. 10, depending which model, and on the exterior should allow at least an inch clearance on the sides and room for the lid to be raised up perpendicular to the unit at a 90% angle for when it is being serviced. The height up off the ground on the outside of the house will be determined from where the interior opening was chosen. It should be low enough for the cat to walk through and give about an inch or two for shoulder height clearance.

1. After the wall opening has been completed, construct the main outer containment box which will be the bottom half of the containment unit. Construct the box to have a bottom and high walls, that will all connect as one piece, but at least one side is flat to fit against the building, leaving the top open. On the top of the flat back side of the box, create a long recessed bar as long as the box and cut an angle downward at the bottom of the bar, to create the hook catch 34, which will be the opposite piece to the ledger hook 33 which angles up from where it is mounted on the house.

2. After the location has been selected and the cut out has been cut through the wall, there is a long ledger 33 bar that will be used to mount the "Kitty Cat Can" 19, shaped like a long straight angled hook that is mounted horizontally above the wall opening with the high sharp angle facing upward and outward. The ledger bar hook 33 is mainly long and rectangular with a sharp angled cut through a percentage of the upper portion of the ledger, facing upward and outward, creating the hook. It is almost as long as the piece that will soon to be mounted on it.

The hook catch 34 will be recessed into the flat rear uppermost area on the outside back of the main outer containment box 26, pointing downward, and will catch on the ledger hook 33 or mounted to the exterior wall of a building over the previously cut porthole that goes completely through to the interior. The outer edges of the back of the box will hold flush up against the building when mounted, leaving a little space behind the back of the box where the hook and ledger will not be visible from the exterior. Make two cutouts into the back of the outer box, one will be closed and one that will ultimately line up with the cut out made in the building. Make the box container at least large enough so that it will fit another high-walled secondary box, inside of it, large enough in size so that small animals will be able to come and go comfortably from the indoors to the exteriorly mounted container for use as their out-house, but small enough so that it will not cause interference on the outside of the building where it is being mounted.

The outer container 26 will be secured by a lid 28 hinged 41 at the back or side, depending on which model, so that it can open for daily litter raking and animal deposits removal. Cut two slots on each side, at the top of this outer box, near the upper most portions except for the back wall. The slots will be minimal in size and will not jeopardize the integrity of the upper frame of the container. At the slots in the upper portions of the outer containment box walls, cut to fit quality fine mesh screen to each slot, and adhere the screens to cover the slots with high strength permanent bonding adhesive or insert the screens as manufactured.

3. Make a high-walled container box 25 to fit just inside the outer box 26 with just enough room so the inner box 25 will be able to be pulled out of the outer box 26 without friction, drag or interface. Make the top of the inner high-walled container box 25 to start just below the screened slots on the outer box 26, and to be higher than the top of the porthole cut outs in the back wall of the outer containment box and deep enough below the cut outs, to allow for 2" to 3" of the cat litter material plus adequate pan depth to discourage animals from racking the litter out the hole. Make handle slots 24 on the right and left side of the inner container box 25.

Make porthole cut outs in the back of the inner container box 25 to match the outer box porthole cut outs as shown in FIG. 12. Now there should be two identical porthole cut outs in the inner container box, to precisely line up and match in size, height and shape, of the outer box porthole cut outs. There is a right and left set of porthole cut outs in the box and only one cut out set will be selected for use, either the right one, or the left one. The unused side will be covered with a plate when not in use. This is an option that may be necessary in order to have some flexibility at installation to the building. When mounted onto the house at the ledger hook 33, all the selected cut outs will line up evenly with the one that goes through the house. At installation when outer containment box 26, containing catch 34, drops into place on the hook 33 whether using the left or the right passage entrance option, it must align up evenly through all cut outs. The ledger bar hook 33 is mounted Into studs on the exterior of the house, or building, at the correct distance above the porthole cut out that goes through the house so that when the outer main containment box 26 is mounted onto the ledger hook 33, it rests against the house hung by the recessed upside down ledger bar hook (male counterpart to the hook catch), built into the back side of the outer containment near the top of the back wall. When attaching this main outer containment box 26 to the house onto the ledger bar hook, it pushes on above the hook and it drops down into place so it rests by its own weight as the drop is completed. No seams are visible on the outside of the box since the ledger mechanisms are recessed into the back wall of the containment.

When the outer box 26 locks into its resting place on the exterior wall ledger hook 33, the inner and outer cut outs of the box and house will align so you can see straight through into the dwelling. The whole containment, "Kitty Cat Can", is capable of lifting off easily when necessary.

The main outer containment box 26 on the exterior needs to be located high enough above the floor plates and above the baseboard of the interior room leaving sufficient room for the casing flange to overlap the rough edges of the hole cut out. On the exterior of the house where the box will be mounted should not interfere with exterior equipment, activities, architecture or the ground.

4a. Make a sleeve through the corridor porthole 32 from the inside of the house, covering all the insides of the wall and cut edges with a connected perpendicular casing flange completely around the opening. When the interior sleeve 32 is slid into the wall hole, it will be stopped by the connected casing. The casing and sleeve is levered and secured in place permanently while the "Kitty Cat Can" is in use.

4b. Make a second exterior sleeve as a counterpart to the interior porthole corridor, a little bit smaller than the first porthole, which will slide inside from the opposite direction from the Litter box side of the box and has a flange that is located perpendicularly around the opening to create a casing on the inside of the removable high-walled container box 25 inside of the container 26. Once in place this porthole corridor becomes the walk way to and from the litter box. It also becomes an important seal that prevents litter, feces and urine from escaping to unwanted areas.

5. Make a sloped, hinged Lid 28 to encapsulate the containment. The lid 28 has a sloped inner frame wall that fits the main box precisely at the rim to create a seal on all sides at the top of the Main containment box to prevent insects from entering. Some modules may not need the inner lid wall, and the lid will sit flush and create the same bug resistant seal. The whole lid is sloped so that rain can drain off. The outer fascia 38 of the lid 28 is separated from the box 26 by a space, between the main lid wall, creating an eve. The eve is extra-long and hangs down vertically past the screen slots to allow air flow in and out of the containment but prevents water and rain from entering. The lid 28 is hinged 41 at the back or side, depending on the model (wall or under window mounts), allowing the lid to be opened up perpendicularly to catch on the exterior wall while/during daily cleaning. Then the lid 28 lowers back into place and locks securely to prevent pets from escaping.

6. On the inside of the house, a decorative rod and curtain may be placed at the porthole entrance of the "Kitty Cat Can" for decoration and added insulation. On the exterior an insulated cover may be obtainable for colder climates.

How to Use It:

Using the "Kitty Cat Can" Outdoor Litter box—A cat or small pet owner accesses and cleans pet a cat litter box from the outside of the home instead of the inside of the home. When it is time for daily cat litter box cleaning, one just goes outside to the "Kitty Cat Can" location, mounted on the exterior of the house in a strategic location, and stands next to the box. Then grabbing the latch 29 located on the front of the box's hinged lid 28, lifts it up to hook temporarily, onto a hook 35, installed on the house. The animal deposits are removed with your favorite litter scoop. After the cat droppings have been removed the owner may refresh the box with the addition of fresh litter. Then the lid 28 will close down and the latch will lock so no animals are able to escape. The porthole on the inside of the house remains continually available for the pets to use at their convenience. Regular raking can be done once a day as desired, depending on how many animals are using one box, and once a month the owner may desire to do a thorough cleaning. To do a thorough cleaning, remove the porthole casing and sleeve from the outdoor side of the inner container box 25 by sliding it out completely. Lift out the inner container box 25, remove the old litter, clean and dry the inner container box with soap and water, and put it back into its position inside of the outer containment box. Slide the porthole casing sleeve back into the porthole opening and refill the container with a bedding afresh cat litter. Close the lid 28, ready for use by the indoor pets.

Thus, specific embodiments of a "Kitty Cat Can" Exterior Mounted Litter Box for In-Door Cats & Kittens & Other Small Animals has been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. An exterior mounted litter box for a dwelling structure comprising:
   an exterior enclosure including a solid outer wall portion defining a compartment, said outer wall portion having a plurality of vents and at least one access portal formed therethrough;
   a removable interior container disposed within the compartment of said exterior enclosure, said removable interior container having a bottom and a side wall portion extending upward from the bottom, said side wall portion having formed therein at least one portal opening aligned with the at least one access portal of said exterior enclosure and terminating at an upper edge disposed below the plurality of vents of said exterior enclosure, said removable interior container having a plurality of handle grip openings formed therein and being configured to accept litter;
   a lid covering a top of said exterior enclosure, said lid being hinged to said exterior enclosure, said lid having a sloped top surface extending beyond said outer wall portion of said exterior enclosure to terminate at a peripheral rim portion projecting vertically downward from and surrounding the top surface, said peripheral rim portion thereby defining a vertical surface remaining spaced from said exterior enclosure while shielding the vents thereof;
   a recessed angled ledger receiving mount extending transversely across a back surface of said exterior enclosure for retentively engaging an angled ledger receiver for securement to the dwelling structure; and,
   an indoor portal liner overlap telescopically coupled to a removable inner route portal liner overlap passed through the at least one portal opening of said removable interior container and the at least one access portal of said exterior enclosure, wherein said indoor portal liner overlap and said inner route portal liner overlap provide access into said removable interior container from inside the dwelling structure.

2. The exterior mounted litter box according to claim 1 that further includes a pressure joined connection between said exterior enclosure and said lid.

3. The exterior mounted litter box according to claim 1 that further includes a latch receiver for mounting above said lid on a vertical wall of the dwelling structure to releasably hold said lid in an elevated orientation.

4. The exterior mounted litter box according to claim 1 wherein said exterior enclosure, said removable interior container, and said lid are made from material selected from the group consisting: of plastic, wood or metal.

5. The exterior mounted litter box according to claim 1 wherein said recessed angled ledger receiving mount is releasably mountable onto said angled ledger receiver to mount said exterior mounted litter box on a building, whereby said exterior enclosure cantilevers from an outside of said building on said recessed angled ledger receiving mount.

6. The exterior mounted litter box according to claim 1 wherein said removable interior container is removable from said exterior enclosure for cleaning of said removable interior container without removal of said exterior enclosure from a building.

7. The exterior mounted litter box according to claim 1 wherein said lid further includes a seal between said lid and said exterior enclosure.

8. The exterior mounted litter box according to claim 1 wherein said plurality of vents are screened.

9. The exterior mounted litter box according to claim 1 wherein said indoor portal liner overlap and said inner route portal liner overlap each have structural flanged ends configured for flush sealing engagement of respective portions of said removable interior container and the dwelling structure.

10. The exterior mounted litter box according to claim 9 wherein said indoor portal liner overlap and said inner route portal liner overlap are adjustable to different dimensions between said structural flanged ends of said indoor portal liner overlap and said inner route portal liner overlap.

11. The exterior mounted litter box according to claim 1 wherein said exterior enclosure includes a plurality of the at least one access portals and said removable interior container includes a plurality of the at least one portal openings each aligned with one of the plurality of access portals.

12. The exterior mounted litter box according to claim 11 wherein at least one of said plurality of access portals accepts said indoor portal liner overlap and said inner route portal liner overlap.

13. The exterior mounted litter box according to claim 11 that further includes an access cover or plate to cover at least one of said aligned plurality of portal openings and access portals.

14. The exterior mounted litter box according to claim 1 wherein said outer wall portion of said exterior enclosure and said side wall portion of said removable interior container each range between 18 and 36 inches in height.

15. The exterior mounted litter box according to claim 1 wherein said angled ledger receiver fits within said recessed angled ledger receiving mount on said back surface of said exterior enclosure to be disposed between side walls of said outer wall portion, to prevent side-to-side movement of said exterior enclosure.

16. The exterior mounted litter box according to claim 1 wherein said exterior enclosure is vertically removable from said angled ledger receiver.

17. The exterior mounted litter box according to claim 1 that further includes a weather flap suspended within said inner route portal liner that covers access to said removable interior container.

18. The exterior mounted litter box according to claim 1 that further includes a portal curtain.

19. The exterior mounted litter box according to claim 1 that further includes a winter cover disposed over said lid and said exterior enclosure.

20. An exterior mounted litter box for a dwelling structure comprising:
  an exterior enclosure including a solid outer wall portion defining a compartment, said outer wall portion having a plurality of vents and at least one access portal formed therethrough;
  a reusable interior container removably disposed within the compartment of said exterior enclosure for holding disposable litter, said removable interior container having a bottom and a side wall portion extending upward from the bottom to terminate at an upper edge disposed below the plurality of vents of said exterior enclosure, said side wall portion having formed therein at least one portal opening aligned with the at least one access portal of said exterior enclosure;
  a lid displaceably covering a top of said exterior enclosure, said lid having a sloped top surface extending beyond said outer wall portion of said exterior enclosure to terminate at a peripheral rim portion projecting vertically downward from and surrounding the top surface, said peripheral rim portion thereby defining a vertical surface remaining spaced from said exterior enclosure while shielding the vents thereof;
  a recessed angled ledger receiving mount extending transversely across a back surface of said exterior enclosure for retentively engaging an angled ledger receiver for securement to the dwelling structure; and,
  a portal assembly passing between the exterior mounted litter box and the dwelling structure to maintain access therebetween, said portal assembly including:
    an indoor portal liner overlap disposed to extend outward from inside the dwelling structure; and,
    a removable inner route portal liner overlap passing from the reusable interior container through the at least one portal opening of said removable interior container and the at least one access portal of said exterior enclosure to telescopically couple to the indoor portal liner overlap.

* * * * *